United States Patent [19]
Haynes

[11] 3,730,361
[45] May 1, 1973

[54] VEHICLE RAMP
[75] Inventor: Orren E. Haynes, Forest Park, Ga.
[73] Assignee: Robert L. Zink, Norwalk, Conn.
[22] Filed: July 28, 1971
[21] Appl. No.: 176,355

[52] U.S. Cl. ..........................214/85, 14/71, 105/436
[51] Int. Cl. ............................................B65g 67/02
[58] Field of Search ..................214/85, 85.1; 14/71; 105/436

[56] References Cited

UNITED STATES PATENTS

| 2,817,102 | 12/1957 | Harris | 14/71 |
| 3,628,209 | 12/1971 | Parent | 14/71 |
| 3,511,393 | 5/1970 | Abromavage et al. | 214/85 |
| 2,449,829 | 9/1948 | Agren | 214/85 X |

*Primary Examiner*—Albert J. Makay
*Attorney*—Robert L. Zink

[57] ABSTRACT

A ramp normally stored on a carrier beneath a surface, the ramp and carrier being brought out along a track fixed beneath the surface into an extended position, the ramp end being then raised to the level of the surface by a strut attached to the carrier creating a triangular truss supported at one end by the track and at the other end by the level being connected with the surface by the ramp. The two ends of the carrier may travel on different tracks, allowing the ramp and carrier, when collapsed together, to follow the configuration of the underside of the surface while returning to the storage position.

By way of an example, a gangway beneath a vehicle which is extended into place, the gangway floor then being raised to the level of the floor of the vehicle while being supported by the framework structure beneath the floor.

2 Claims, 2 Drawing Figures

PATENTED MAY 1 1973  3,730,361

INVENTOR.
ORREN E. HAYNES
BY R L Bird
ATTORNEY

3,730,361

VEHICLE RAMP

BACKGROUND OF THE INVENTION

This invention is a temporary gangway, with one end attached, bridging from one point to a second point, where the second point may not be able to support the load, and where the gangway therefore depends upon structure immediately beneath the second point for support.

Access-ways for smaller trucks and busses are generally unattached to the vehicle, requiring them to be carried loose within the vehicle or requiring multiple ramps, one stored at each terminal. The present invention, being retractable beneath the vehicle, has neither of these drawbacks, and additionally has the advantage of not having to be supported by the floor plate of the vehicle. Floor plates are not generally constructed to support heavy concentrated loads at the vehicle exit; the present invention transmits the load upon the ramp to the frame of the vehicle. Steps that fold out from a vehicle are available, but these are unsuitable for wheelchairs and handtrucks. This invention provides a flat surface for these uses.

SUMMARY OF THE INVENTION

The object of the invention is to provide a compactly stored ramp for busses and small trucks that can easily be extended from the vehicle for entrance and exit of wheelchairs and handtrucks. It is a further object of my invention to support the ramp load from the frame of the vehicle rather than from the floor of the vehicle. My invention accomplishes this by using a collapsible truss that can be retracted under the body of the vehicle when not in use. The truss feature allows the end of the ramp plate to be raised to the vehicle floor level and then be supported by a carrier which is itself supported by the vehicle frame. In its extended position, the ramp and carrier swivel from their support point at the vehicle, allowing the ramp to rest on ground level, or alternatively on curbs or higher levels. This retained swivel connection to the vehicle provides a safe platform that cannot slip or move out of position. The ramp and carrier retract into a track beneath the vehicle when not in use. This track provides the support and retainer for the vehicle end of the ramp when extended; thus the ramp is at all times safely attached to the vehicle. My invention is not limited to use on vehicles, but may be used any place a gangway is appropriate. Whenever two levels are to be bridged, the ramp and carrier may be stored beneath one of the levels. My invention may be used whenever a fairly contiguous removable surface is desired between two levels, one of which cannot support the loading, and where it is impractical to transmit the load to the ground below but where there is a support beneath the weak level capable of handling the load; for example, the ramp assembly may be stored in the highest riser on a flight of stairs, being extended to temporarily convert a stairway to a ramp surface.

DESCRIPTION OF THE PREFERRED EMBODIMENT

Figure 1:
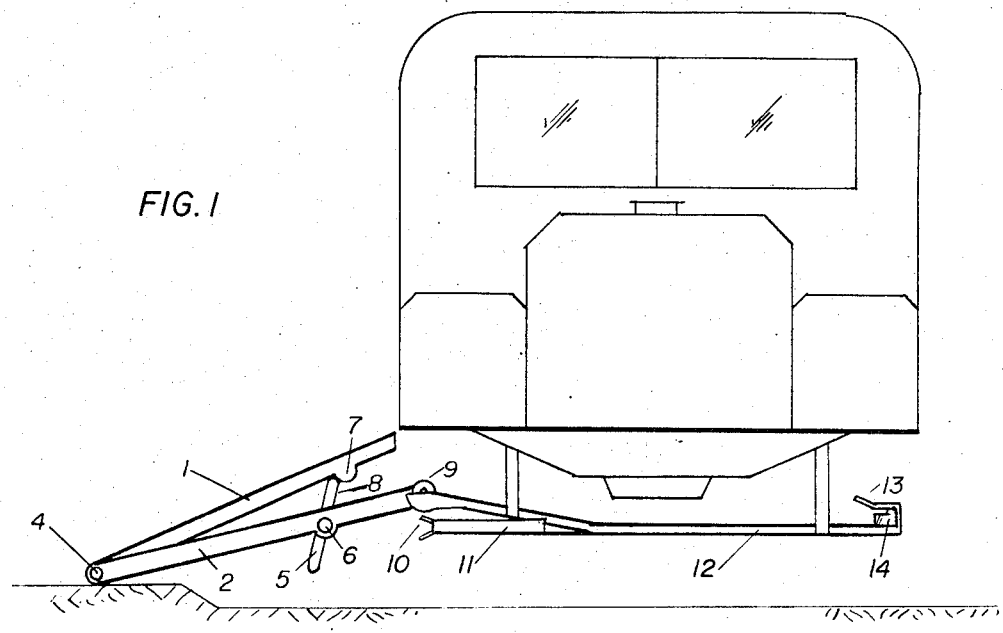
FIG. 1 is a view of the front of the vehicle. The wheel and axle assemblies of the vehicle have not been drawn so that a side view of the installed gangway assembly may be shown, extended and ready for use.
Figure 2:
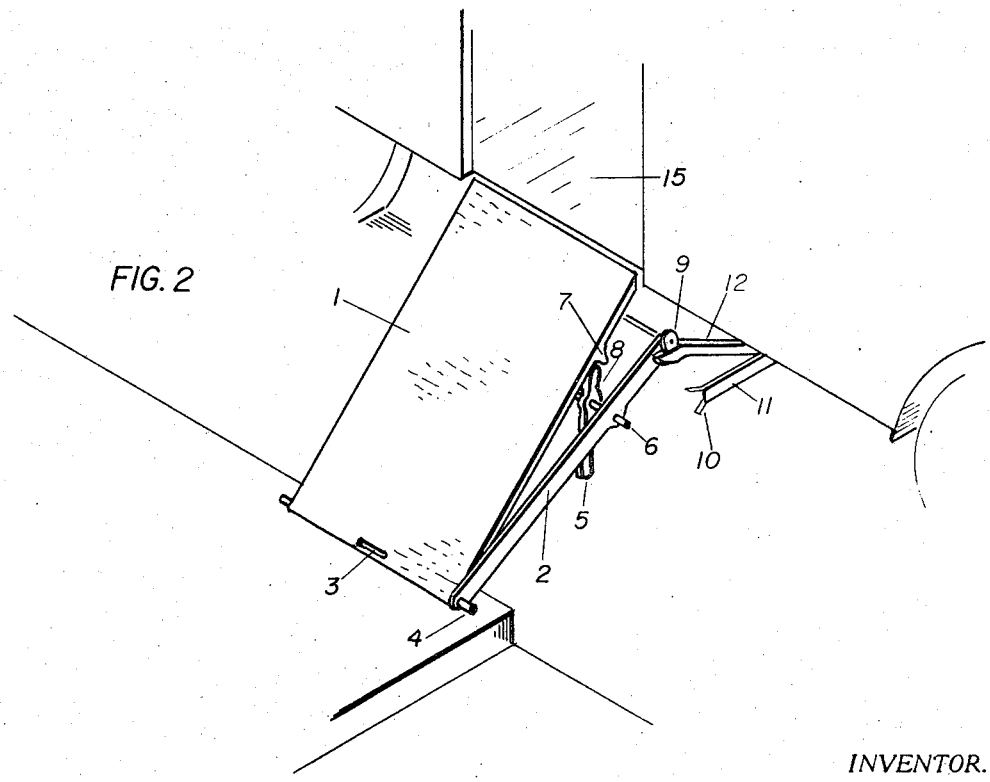
FIG. 2 is a perspective view looking down at the ramp, again extended and ready for use.

In a gangway, a ramp 1 furnishes access from a vehicle floor 15 to ground level. The ramp 1 is connected to the carrier 2 by a swivel joint shaft 4. A strut 8 is moved into place by moving a lever 5 clockwise about an axle 6 over center and against a stop 7 to hold the end of the ramp 1 up to the level of the floor 15. The weight of the ramp 1 and any load it may carry are transmitted through the strut 8 to the axle 6 and thus to the carrier 2. The vehicle end of the carrier has rollers 9 attached which rest in a dip in a track 12 attached to the frame of the vehicle. It is thus seen that a load on the ramp 1 is not transmitted to the vehicle floor 15 but to the vehicle frame through the track 12. By matching the track 12 to the configuration of the vehicle frame, the required lift of the ramp 1 and the length of the strut 8 and lever 5 are minimized. The gangway is collapsed and stored under the vehicle as follows; the lever 5 is rotated counter-clockwise, moving the strut 8 away from the strut stop 7 until the strut 8 is parallel with the carrier 2 and the ramp 1 is allowed to collapse against the carrier 2, and is prevented from further falling by the axle 6. The ramp 1 and carrier 2 are lifted by a handle created by a slot 3 near the swivel joint shaft 4. By pushing the collapsed ramp assembly towards the vehicle, the rollers 9 follow the track 12 and the ends of the swivel joint shaft 4 enter the shaft retainer track opening 10 and move into the shaft retainer track 11. The axle 4 is retained by a standard mechanical latch which may be located on the shaft retainer track 11, and being a commonplace item, is not shown on the drawing. When the roller 9 reaches the far end of the track, it compresses a spring 14 which keeps the ramp from rattling when the vehicle is in motion. The shaft retainer track 11 by its configuration will control the slope of the ramp 1 and carrier 2 while the ends of the swivel joint shaft 4 are contained therein, and the path and position of the ramp 1 and carrier 2 are thereby uniquely determined in this range. While the shaft retainer track 11 as shown on the drawing is straight, it is understood that its configuration may be curved as required to make the path of the collapsed ramp assembly follow the underside of the vehicle.

I claim:
1. A storable gangway comprising
   a. a carrier
   b. a ramp, rotatably connected to the carrier at one end
   c. separating means for rotating the ramp relative to the carrier
   d. a compression member insertable between the unconnected ends of the ramp and carrier, thereby creating a triangular truss
   e. a fixed track supporting the unconnected end of the carrier wherein the carrier and ramp may be collapsed together by removing the compression member, the ramp and carrier then being slideable along the track for storage, and wherein the track is fixed to the bottom framework of a vehicle, and the ramp, when raised into the truss position, being held by the compression member at the level of the vehicle floor.

2. The gangway of claim 1 in combination with a second track which receives and guides the rotatably connected end of the ramp and carrier wherein the path of the ramp and carrier when being returned to the storage position is positively controlled, and the storage position is uniquely determined.

* * * * *